US006744646B2

(12) United States Patent
Huang et al.

(10) Patent No.: US 6,744,646 B2
(45) Date of Patent: Jun. 1, 2004

(54) DEVICE AND METHOD FOR CONVERTING A LOW VOLTAGE SIGNAL INTO A HIGH VOLTAGE SIGNAL

(75) Inventors: Jin-Cheng Huang, Taipei (TW); Yen-Mou Huang, Changhua (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 09/975,322

(22) Filed: Oct. 12, 2001

(65) Prior Publication Data

US 2002/0093323 A1 Jul. 18, 2002

(30) Foreign Application Priority Data

Dec. 12, 2000 (TW) ....................................... 89127440 A

(51) Int. Cl.[7] ................................................. H02M 3/18
(52) U.S. Cl. .......................... 363/59; 307/110; 327/537
(58) Field of Search ............................ 363/59; 307/109, 307/110; 327/530, 536, 537

(56) References Cited

U.S. PATENT DOCUMENTS 5,517,397 A * 5/1996 Quek et al. .............. 363/21.16
5,886,887 A * 3/1999 Jenq ........................... 307/110
6,002,599 A * 12/1999 Chow ......................... 323/284

FOREIGN PATENT DOCUMENTS

EP 0 789 456 A1 8/1997

* cited by examiner

*Primary Examiner*—Bao Q. Vu
(74) *Attorney, Agent, or Firm*—Rabin & Berdo, P.C.

(57) ABSTRACT

A device and method for converting a low voltage signal into a high voltage signal are provided, which can be implemented by using a low voltage CMOS manufacturing process to convert a low voltage signal of 0V to 1.5V into a high voltage signal of 2.5V to 1.25V. According to one preferred embodiment, PMOS transistors are employed to perform voltage level conversion and supply voltages of 1.25V and 2.5V are supplied to the PMOS transistors. During the conversion, no current path exists between the supply voltages thus effectively reducing static power consumption. In addition, the low level of the high voltage signal is outputted through the drain and source of the transistor so that the low level of the high voltage signal can be accurately defined and not affected by manufacturing parameters.

30 Claims, 3 Drawing Sheets

DEVICE AND METHOD FOR CONVERTING A LOW VOLTAGE SIGNAL INTO A HIGH VOLTAGE SIGNAL

This application incorporates by reference Taiwanese application Serial No. 089127440, filed Dec. 12, 2000.

BACKGROUND OF THE INVENTION

1. Field of the Invention

The present invention relates to a voltage regulating device. More particular, the present invention relates to a voltage regulating device that is implemented by a low voltage CMOS manufacturing process and capable of enduring a high voltage output.

2. Description of the Related Art

Due to highly developed technology of VLSI process for CMOS devices, the sizes of transistors become more compact and their operation voltage are also considerably reduced. However, due to specification and noise margin, voltage signals outputted from an IC chip are usually higher than voltage signals inside the IC chip when the voltage signals are transmitted between IC chips. For example, the voltage signals inside the IC chip may be 0V~1.5V, but its output voltage signals may be 0V~2.5V. Accordingly, in practice, it needs a voltage level regulator to regulate lower voltage signals (such as 0V~1.5V) inside the IC chips into higher voltage signals (such as 0V~2.5V).

Generally speaking, transistors made by more advanced CMOS manufacturing process, the voltage endured between two electrodes of the transistor becomes lower and lower. Namely, the operation voltage between the gate and source ($V_{GS}$), or the operation voltage between the gate and drain ($V_{GD}$) falls with a lower voltage range. Therefore, it must use a transistor that can be operated in higher voltages, such as a dual-gate transistor, during the voltage regulating process from lower voltage signals to higher voltage signals. However, the transistors having higher operation voltages usually consume more powers and heats. In order to improve such defects, a voltage level regulating device made by the low voltage CMOS manufacturing process, as shown in FIG. 1, is provided such that $V_{GS}$ and $V_{GD}$ of each transistor are in the accessible range of the low voltage CMOS manufacturing process and the chip can output high voltages.

FIG. 1 shows an output stage of an I/O circuit according to a conventional art. Referring to FIG. 1, the voltage signal in the IC chip is a low voltage signal 130 having a range of 0V~$V_{DD}$, and $V_{DD}$ is 1.5V for example. The output voltage of the chip is 0V~$V_{CC}$, and $V_{CC}$ is 2.5V for example, wherein $V_{CC}>V_{DD}>V_{CC}/2$. In practice, voltage $V_{CC}$ is greater than maximum endurable voltage for voltages $V_{GS}$, $V_{GD}$ of the transistor in the low voltage CMOS manufacturing process. Preventing transistors from damage, it must envisage the voltage endurance issues to improve circuit structure. According to the conventional method, gates of two transistors MPC and MNC are biased at $V_{CC}/2$ and both interposed between transistors MPD and MND that serve as an output stage for an I/O circuit, wherein $V_{CC}/2$ is less than maximum endurable voltage for voltages $V_{GS}$, $V_{GD}$ of the transistor in the low voltage CMOS manufacturing process. FIG. 1 shows two voltage level regulating device, one of which is a voltage level rising regulator 110 and the other is voltage level lowering regulator 120. The voltage level rising regulator 110 is used for regulating the voltage signals inside the IC chip from 0V~$V_{CC}$ to $V_{CC}$~$V_{CC}/2$ and then transmitting them to the gate of the transistor MPD, while the voltage level lowering regulator 120 is used for regulating the voltage signals inside the IC chip from 0V~$V_{CC}$ to $V_{CC}/2$~0 and then transmitting them to the gate of the transistor MND. Accordingly, the voltages $V_{GS}$ and $V_{GD}$ of the transistors MPD, MND, MPC and MNC can be controlled without exceeding $V_{CC}/2$, for preventing the transistors from damages due to high operation voltages.

When the voltage signal inside the IC chip is 0V, the output voltage $V_{CC}$ of the voltage level rising regulator 110 causes the transistors MPD, MPC to be turned off and the output voltage $V_{CC}/2$ of the voltage level lowering regulator 120 causes the transistors MND, MNC to be turned on, by which the output voltage of the IC chip becomes 0V. In contrast, when the voltage signal inside the IC chip is $V_{DD}$, the output voltage $V_{CC}/2$ of the voltage level rising regulator 110 causes the transistors MPD, MPC to be turned on and the output voltage 0V of the voltage level lowering regulator 120 causes the transistors MND, MNC to be turned off, by which the output voltage of the IC chip becomes $V_{CC}$.

As described above, when the voltage signal inside the IC chip is 0V, the IC chip outputs a voltage of 0V, and when the voltage signal inside the IC chip is $V_{DD}$, the IC chip outputs a voltage of 0$V_{CC}$. Therefore, it can be learned that the voltage level rising regulator 110 is used for converting the low voltage signal 130 into a high voltage signal 140 having a range of $V_{CC}$~$V_{CC}/2$, while the voltage level lowering regulator 120 is used for converting the low voltage signal 130 into a lower voltage signal having a range of $V_{CC}/2$~0V.

FIG. 2 shows the function of the voltage level rising regulator. The voltage level rising regulator 110 can covert the low voltage signal 130 into the high voltage signal 140, in which the low voltage signal 130 is between a low level 131 of the low voltage signal 130 and a high level 135 of the low voltage signal 130 and the high voltage signal 140 is between a low level 141 of the high voltage signal 140 and a high level 145 of the high voltage signal 140. For example, the low voltage signal 130 can the voltage signal inside the IC chip, and low level 131 is 0V, the high level 135 is $V_{DD}$, the high voltage signal 140 is the output of voltage level rising regulator 110, the low level 141 is $V_{CC}/2$, and the high level 145 is $V_{CC}$.

It should be noted that voltage level rising regulator 110 is implemented by the low voltage CMOS manufacturing process and output voltages of $V_{CC}$~$V_{CC}/2$. However, $V_{CC}$ has exceeded the voltage endurances for $V_{GS}$, $V_{GD}$ of the low voltage CMOS manufacturing process. During circuit design, it must guarantee that $V_{GS}$, $V_{GD}$ of each transistor in voltage level rising regulator 110 are operated within an allowable voltage range in order that the circuit can be normally worked. Therefore, one of solutions for solving this issue, shown in FIG. 3, is provided.

FIG. 3 shows a conventional voltage level rising regulator, which is published on IEEE JSSC, November, 1999. Metal-oxide-semiconductor (MOS) transistor is extensively used in integrated circuits and it usually uses PMOS to denote a P-type MOS transistor and NMOS to denote a N-type MOS transistor. According to the disclosure, the maximum voltage endurance is 2.4V for $V_{GS}$ and $V_{GD}$ of the CMOS transistors. When the voltage $V_{DD}$ of the output stage of the I/O circuit is 3.3V , the amplitude of input voltage of the voltage level rising regulator is 0V~1.8V. The pbias terminal voltage is 1.1V, the pdrive output voltage is 3.3V~(1.1+$V_{tp}$), wherein is the threshold voltage of PMOS transistors TP3, TP4, and the en 18_buffered voltage is 0V.

When the gate voltage of the transistor TN1 is 1.8V, voltages at nodes node1 and node2 are 0V. Theoretically, because the transistor TP3 is biased at pbias, the terminal voltage of pdrive is pulled down to pbias $+V_{tp}$. Considering the subthreshold leakage and well leakage, the terminal voltage of pdrive is perhaps pulled down to 0, and then $V_{GS}$ of the transistors Tp1 and TP2 exceeds maximum endurable voltage drop 2.4V. Therefore, a transistor TP5 is used for pulling up current, for avoiding voltage pdrive from dropping below pbias. When the voltage fed to the transistor TN1 is 0V, the voltages at node node2 and node4 become 0V. As a result, voltage pdrive is pulled down to pbias $+V_{tp}$ to turn on the transistor TP1 and then pulls the voltage pdrive up to 3.3V.

Accordingly, in the conventional circuit, the transistors TP3, TP4 are used to avoid transistors TP1, TP2 from operating under high $V_{GS}$ and $V_{GD}$. Similarly, the transistors TN3, TN4 are used to avoid transistors TN1, TN2 from operating under high $V_{GS}$ and $V_{GD}$.

In summary, using the circuit mentioned above, low voltage signals are regulated to high voltage signals. The low voltage signals are between a low level (0V) of the low voltage and a high level ($V_{DD}$) of the low voltage, and fed to the gate of the transistor TN1. The high voltage between a low level (pbias $+V_{tp}$) of the high voltage and a high level (0VDD) of the high voltage appears at pdrive. When the low level (0V) of the low voltage is fed to the circuit, the pdrive outputs the high level (0VDD) of the high voltage, and when the high level (VDD) of the low voltage is fed to the circuit, the pdrive outputs the low level (pbias $+V_{tp}$) of the high voltage.

In regard to the conventional voltage level rising regulator, there are several drawbacks. First, when the transistor TN1 is turned on, the voltage pdrive becomes pbias $+V_{tp}$. And at the same time, as described, the transistors TP5, TP3, TN3 and TN1 are turned on, causing a DC current flows from power 0VDD through the transistors TP5, TP3, TN3 and TN1 to ground GND. In addition, when the transistor TN2 is turned on, the transistors TP6, TP4, TN4 and TN2 are turned on, causing a DC current flows from power 0VDD through the transistors TP6, TP4, TN4 and TN2 to ground GND. Therefore, during the voltage level conversion, no matter what the conductive path is, there always existing a DC current flowing between a high voltage (the 0VDD) and a low voltage level (the ground), causing over consumption of the static power.

Secondly, the output level of the pdrive terminal is between pbias $+V_{tp}$ and 0DD, meaning that logic "0" represented by pbias $+V_{tp}$ varies with manufacturing parameters and cannot be accurately determined. For fixing the voltage level of the logic "0", it needs to adjust the voltage pbias, causing complexity of operation.

SUMMARY OF THE INVENTION

Accordingly, it is an objective of the present invention to provide a voltage level rising regulator, which is a device for converting a low voltage signal into a high voltage signal, wherein the high voltage signal is between a low level and a high level. No matter what the condition is no current path is formed between supply voltages of the high level and the low level in the circuit of the device, thus effectively preventing generation of DC currents and static power consumption.

It is another objective of the invention to provide a voltage level rising regulator, which is a device for converting a low voltage signal into a high voltage signal, wherein the high voltage signal is between a low level and a high level. The device outputs the low level of the high voltage signal through the drain and source of a transistor such that the low level of the high voltage signal can be accurately defined and not affected by manufacturing parameters.

According to above objectives of the invention, it provides a voltage level rising regulator and its operating method set forth as follows.

A low voltage signal of 0V is inputted to a drain of a first NMOS transistor to turn it on, and through the source of the first NMOS transistor the 0V voltage is applied to a gate of a first PMOS transistor. The source of the first PMOS transistor is connected to a voltage of 1.25V. As the 0V voltage is inputted to the gate of the first PMOS transistor, the first PMOS transistor is turned on. Therefore, the drain of the first PMOS transistor is also 1.25V and that is further applied to another PMOS transistor, a second PMOS transistor. The source of the second PMOS transistor is connected to a voltage of 2.5V. As the 1.25V voltage is inputted to the gate of the second PMOS transistor, the second PMOS transistor is turned on. Therefore, the drain of the second PMOS transistor is also 2.5V. Accordingly, the drain of the second PMOS transistor can be used as the output of the regulator, by which when a low voltage signal of 0V voltage is inputted, a 2.5V voltage, i.e. the high level of the high voltage signal, is outputted.

On the other hand, when a low voltage signal of 1.5V is applied to the regulator, this low voltage signal is inverted to a voltage of 0V by an inverter. The inverted low voltage signal is further inputted to a drain of a second NMOS transistor to turn on the second NMOS transistor, by which the 0V voltage is applied to the gate of a third PMOS transistor. The source of the third PMOS transistor can be connected to 1.25V. As the 0V voltage is inputted to the gate of the third PMOS transistor, the third PMOS transistor is turned on such that the drain and the source of the third PMOS transistor are 1.25V. Accordingly, the drain of the third PMOS transistor can be the output of the regulator, by which when the low voltage signal of 1.5V voltage is inputted, a 1.25V voltage, i.e. the low level of the high voltage signal, is outputted.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENTS

Figure 1:
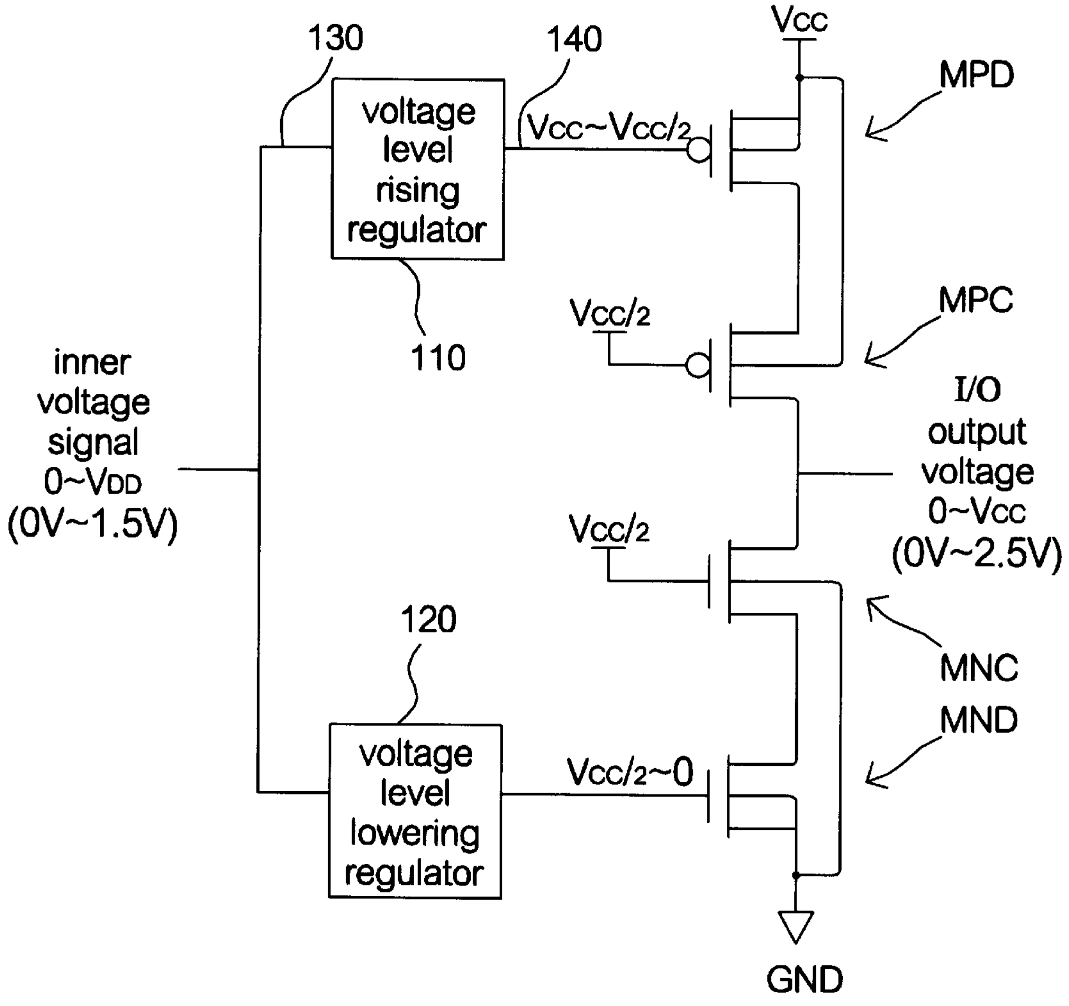
FIG. 1 (PRIOR ART)
FIG. 1 is a schematic block diagram of a conventional output stage of an I/O circuit.
Figure 2:
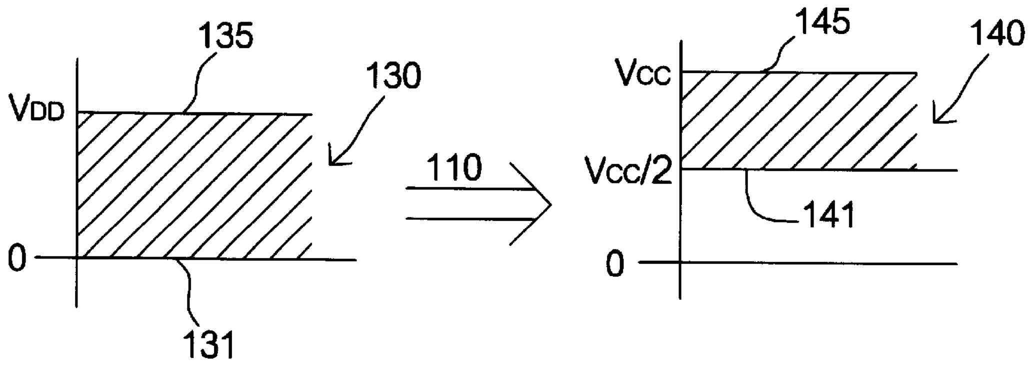
FIG. 2 (PRIOR ART)
FIG. 2 shows the function of the voltage level rising regulator
Figure 3:
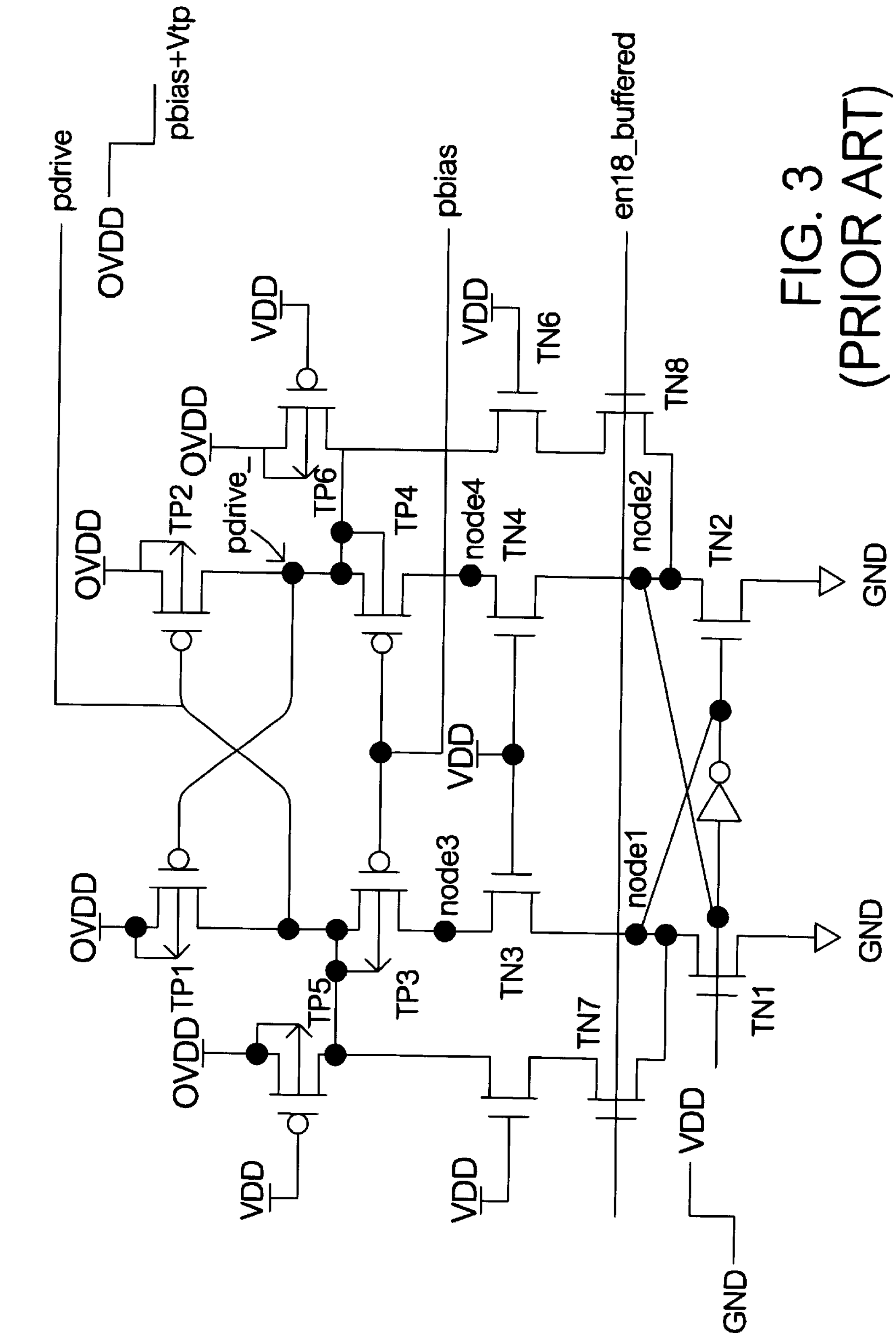
FIG. 3 (PRIOR ART)
FIG. 3 shows a circuit diagram of a conventional voltage level regulator.
Figure 4:
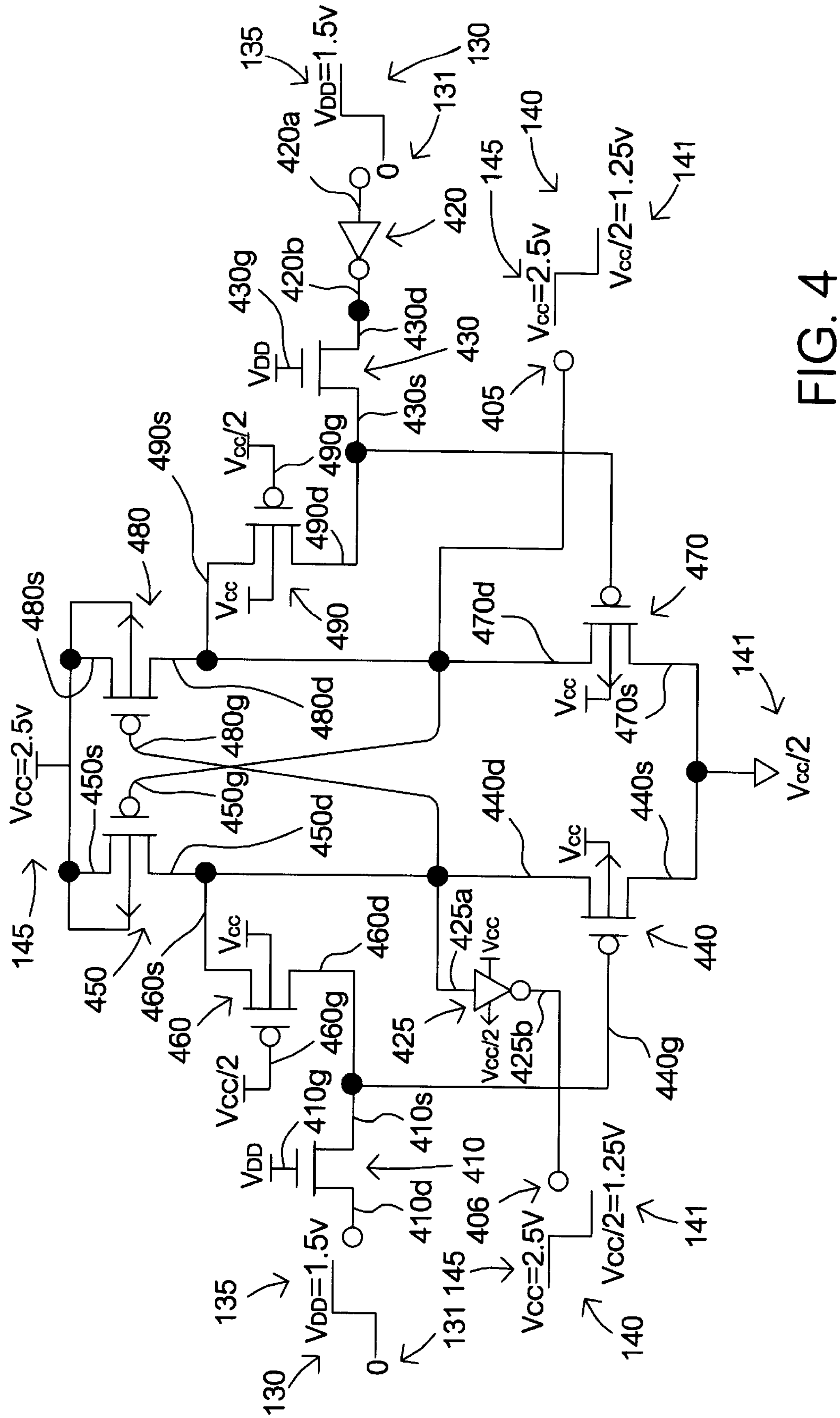
FIG. 4 shows a circuit diagram of a voltage level regulator according to one preferred embodiment of the invention.

FIG. 4 shows a voltage level rising regulator according to one preferred embodiment of the invention. Using the circuit, a low voltage signal 130 can be regulated to a high voltage signal 140, wherein the low voltage signal 130 is between a low level 131 and a high level 135 in which for example the high level 135 can be $V_{DD}$ (such as 1.5V) and the low level 131 can be 0V. In addition, the high voltage signal 140 is between a low level 141 and a high level 145 in which for example the high level 145 can be $V_{CC}$ (such as 2.5V) and the low level 141 can be $V_{CC}/2$(=1.25V). The voltage level rising regulator comprises circuit elements as follows.

A NMOS transistor 410 has a drain 410*d*, a gate 410*g* and a source 410*s*. The low voltage signal 130 is inputted to the drain 410*d*. In addition, the high level 135 of the low voltage signal 130 is inputted to the gate 410*g* for providing a bias to turn on the NMOS transistor 410.

An inverter 420 has an input end 420*a* for receiving the low voltage signal 130 and an output end 420*b*.

An NMOS transistor 430 has a drain 430*d*, a gate 430*g* and a source 430*s*. The drain 410*d* is connected to the output end 420*b* of the inverter 420. In addition, the high level 135 of the low voltage signal 130 is inputted to the gate 430*g* for providing a bias to turn on the NMOS transistor 430.

A PMOS transistor 440 has a base 440*b*, a drain 440*d*, a gate 440*g* and a source 440*s*. The gate 440*g* is connected to the source 410*s* of the NMOS transistor 410, the bas 440*b* is connected to the drain 440*d*, and the low level 141 of the high voltage 140 is inputted the source 440*s*.

A PMOS transistor 450 has a drain 450*d*, a gate 450*g* and a source 450*s*. The drain 450*d* is connected to the drain 440*d* of the PMOS transistor 440, and the high level 145 of the high voltage 140 is inputted the source 450*s*.

A PMOS transistor 460 has a base 460*b*, a drain 460*d*, a gate 460*g* and a source 460*s*. The drain 460*d* is connected to the source 410*s* of the NMOS transistor 410, the source 460*s* is connected the drain 450*d* of the PMOS transistor 450. In addition, the low level 141 of the high voltage signal 140 can be fed to the gate 460*g* for providing a bias to turn on the PMOS transistor 460. The high level 145 of the high voltage signal 140 is inputted to the base 460*b*.

A PMOS transistor 470 has a base 470*b*, a drain 470*d*, a gate 470*g* and a source 470*s*. The gate 470*g* is connected to the source 430*s* of the NMOS transistor 430, the drain 470*d* is connected to the gate 450*g*, and the base 470*b* is connected to the drain 470*d*. The low level 141 of the high voltage signal 140 is inputted to the source 470*s*.

A PMOS transistor 480 has a drain 480*d*, a gate 480*g* and a source 480*s*. The drain 480*d* is connected to the drain 470*d* and the gate 480*g* is connected to the drain 440*d*. The high level 145 of the high voltage signal 140 is inputted to the source 480*s*.

A PMOS transistor 490 has a base 490*b*, a drain 490*d*, a gate 490*g* and a source 490*s*. The drain 490*d* is connected to the source 430*s* and the source 490*s* is connected to the drain 480*d*. In addition, the low level 141 of the high voltage signal 140 is inputted to the base 490*b*. An output 405 is connected to the drain 470*d*.

In addition, an inverter 425 has an input end 425*a* connected to the drain 440*d* and an output end 425*b* used as an output of the regulator instead of the output 405.

Referring to FIG. 4, the operation of the voltage level rising regulator of the invention is described in detail as follows. First, a condition that the low voltage signal 130 is the low level 131 (0V in the example) is discussed. Under the condition, the gate 410*g* of the NMOS transistor 410 is biased at 1.5V. The NMOS transistor 410 is turned on while 0V is fed to the drain 410*d* of the NMOS transistor 410, thereby 0V is further fed to the gate 440*g* through the NMOS transistor 410 to turn on the PMOS transistor 440. As the PMOS transistor 440 is turned on, both the drain 440*d* and the source 440*s* have the same voltage level, the low level 141 of the high voltage signal 140 ($V_{CC}/2$=1.25V, for example). The voltage at the drain 440*d* (1.25V) turns off the PMOS transistor 460 and turns on the PMOS transistor 480. After the PMOS transistor 480 is turned on, both the drain 480*d* and the source 480*s* have the same voltage level, the high level 145 of the high voltage signal 140 ($V_{CC}$=2.5V, for example). The voltage at the drain 480*d*, 2.5V, is fed to the gate 450*g* to turn off the PMOS transistor 450, and also fed to the source 490*s* to turn on the PMOS transistor 490. At the time, both the drain 490*d* and the source 490*s* have the same voltage level, 2.5V. The voltage at the drain 490*d*, 12.5V, is then fed to the gate 470*g* to turn off the PMOS transistor 470.

Furthermore, the output 405 can output voltage $V_{CC}$ because the drains 480*d* and 470*d* are connected and the drain 470*d* is used as the output 405. In addition, the output 405 can output voltage $V_{CC}$ (2.5V for example) with no influence since the PMOS transistor 470 is turned off.

On the other hand, 0V is also inputted to the input end 420*a* of the inverter 420. Through the inverter 420, the voltage level at the output end 420*b* is 1.5V, which is then inputted to the drain 430*d* to turn off the NMOS transistor 430. This will not affect the operation of the voltage level rising regulator of the invention. Therefore, when the low level 131 of the low voltage signal 130 is inputted to the regulator, the high level of the high voltage signal ($V_{CC}$ in the example) is stably outputted.

Next, a condition that the low voltage signal 130 is the high level 135 (1.5V in the example) is discussed. Under the condition, as 1.5V is fed to the input end 420*a* of the inverter 420, the output end 420*b* of the inverter 420 becomes 0V and then is fed to the drain 430*d* of the NMOS transistor 430 to turn on the NMOS transistor, thereby 0V is inputted to the gate 470*g* through the transistor 430 to turn on the PMOS transistor 470. As the PMOS transistor 470 turns on, both the drain 470*d* and the source 470*s* have the same voltage level, the $V_{CC}/2$ (1.25V in the example). The voltage level at the drain 470*d*, 1.25V, can turn off the PMOS transistor 490 and turn on the PMOS transistor 450. As the PMOS transistor 450 turns on, both the drain 450*d* and the source 450*s* have the same voltage level, 2.5V in the example. The voltage level at the drain 450*d*, 2.5V, is inputted to the gate 480*g* to turn off the PMOS transistor 480 and is also inputted to the source 460*s* to turn on the PMOS transistor 460, thereby both the drain 460*d* and the source 460*s* have the same voltage level, $V_{CC}$ (2.5V in the example). The voltage at the drain 460*d*, 2.5V, is inputted to the gate 440*g* to turn off the PMOS 440.

Furthermore, because the drain 470*d* is the output 405 of the invention, the output 405 can output voltage $V_{CC}/2$. On the other hand, the voltage of 1.5V is inputted to the drain 410*d* of the NMOS transistor 410 to turn it off, and therefore. NMOS transistor 410 will not affect the output voltage level at the output 405. Accordingly, when the high level 135 ($V_{DD}$ in the example) of the low voltage signal 130 is inputted to the regulator, the low level of the high voltage signal ($V_{CC}/2$ in the example) is stably outputted.

Moreover, the voltage signal of the output 405 is inverse to that of the drain 440*d* each other. Therefore, using the inverter 425 to invert the voltage signal at the drain 440*d* obtains the same voltage signal as the output 405. The output end 425*b* of the inverter 425 can serve as the output 406 of the regulator of the invention.

The invention also provided a method for rising a voltage level, comprising the steps as follows.

First, the low level 131 of the low voltage signal 130, i.e. as the low voltage signal 130 being at the low level 131, is converted to the high level 145 of the high voltage 140 and the high voltage signal 140 is then outputted. The low level 131 of the low voltage signal 130 is inputted to the gate 440g of the PMOS transistor 440 to turn it on. As the PMOS transistor 440 is turned on, through the PMOS transistor 440, the voltage at the drain 440d, i.e. the low level 141 of the high voltage 140, is inputted to the gate 480*g* of the PMOS transistor 480 to turn on the PMOS transistor 480. As the PMOS transistor 480 is turned on, through the PMOS transistor 480, the drain 480d outputs the high level 145 of the high voltage 140.

In addition, the high level 135 of the low voltage signal 130, i.e. as the low voltage signal 130 being at the high level 135, is converted to the low level 141 of the high voltage 140 and the high voltage signal 140 is then outputted. The high level 135 of the low voltage signal 130 is inverted and then inputted to the gate 470*g* of the PMOS transistor 470 to turn it on. Then, low level 141 of the high voltage signal 140 is inputted to the source 470*s* of the PMOS transistor 470. As the PMOS transistor 470 is turned on, the drain 470*d* outputs the low level 141 of the high voltage signal 140.

In summary, when the voltage of 0V is inputted to the regulator, the output 405 can output the voltage of $V_{CC}$ and when the voltage of $V_{DD}$ is inputted, the output 405 can output the voltage of $V_{CC}/2$. It should be noted that when the output voltage at the output 405 is $V_{CC}$, the voltage at the drain 440*d* is $V_{CC}/2$, and when the output voltage at the output 405 is $V_{CC}/2$, the voltage at the drain 440*d* is $V_{CC}$. Moreover, according to the invention, because the low level 141 of the high voltage signal 140 ($V_{CC}/2$=1.25V in the example) is transmitted between the source and drain of the PMOS transistor rather than transmitted between the gate and drain in the conventional circuit, the low level of the high voltage signal can be accurately defined no matter what the manufacturing parameters are. Accordingly, the output voltage can be switched between $V_{CC}$ and $V_{CC}/2$.

It should be noted that when the voltage of 0V is inputted to the regulator, because the PMOS transistor 440 is turned on and the PMOS transistor 450 is turned off, no current path is formed between VCC and VCC/2. On the other hand, when the voltage of 1.5V is inputted to the regulator, because the PMOS transistor 470 is turned on and the PMOS transistor 480 is turned off, no current path is formed between VCC and VCC/2. Therefore, no matter what condition is, no current path is formed between VCC and VCC/2, whereby it effectively eliminates the generation of DC current and then significantly reduces the static power consumption.

Accordingly, as described above, the invention benefits from following advantages:

1. No matter what condition is, no current path is formed between VCC and VCC/2, whereby it effectively eliminates the generation of DC current and then significantly reduces the static power consumption.

2. Because the low level of the high voltage signal 140 is transmitted between the source and drain of the PMOS transistor, the low level of the high voltage signal can be accurately defined no matter what the manufacturing parameters are.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A voltage level rising regulator, for converting a low voltage signal to a high voltage signal, wherein the low voltage signal is between a low level and a high level of the low voltage signal, and the high voltage level is between a low level and a high level of the high voltage signal, the voltage level rising regulator comprising:

a first NMOS transistor, having a drain, a gate and a source, and the low voltage signal being applied to the drain of the first NMOS transistor;

an inverter, having an input terminal and an output terminal, and the low voltage signal being applied to the input terminal of the inverter;

a second NMOS transistor, having a drain, a gate and a source, and the drain of the second NMOS transistor being coupled to the output terminal of the inverter;

a first PMOS transistor, having a drain, a gate and a source, wherein the gate of the first PMOS transistor is connected to the source of the first NMOS transistor and the low level of the high voltage signal is inputted to the source of the first PMOS transistor;

a second PMOS transistor, having a drain, a gate and a source, wherein the drain of the second PMOS transistor is connected to the drain of the first PMOS transistor, and the high level of the high voltage signal is inputted to the source of the second PMOS transistor;

a third PMOS transistor, having a drain, a gate and a source, wherein the source is biased, the drain of the third PMOS transistor is connected to source of the first NMOS transistor, and the source of the third PMOS transistor is connected to the drain of the second PMOS transistor;

a fourth PMOS transistor, having a drain, a gate and a source, wherein the gate of the fourth PMOS transistor is connected to the source of the second NMOS transistor, the drain of the fourth PMOS transistor is connected to the gate of the second PMOS transistor, and the low level of the high voltage signal is inputted to the source of the fourth PMOS transistor;

a fifth PMOS transistor, having a drain, a gate and a source, wherein the drain of the fifth PMOS transistor is connected to the drain of the fourth PMOS transistor and the gate of the fifth PMOS transistor is connected to the drain of the first PMOS transistor, and the high level of the high voltage signal is inputted to the source of the fifth PMOS transistor;

a sixth PMOS transistor, having a drain, a gate and a source, wherein the source is biased, the drain of the sixth PMOS transistor is connected to the source of the second NMOS transistor, and the source of the sixth PMOS transistor is connected to the drain of the fifth PMOS transistor; and an output end, connected to the drain of the fourth PMOS transistor.

2. The regulator of claim 1, wherein the low level of the low voltage signal is 0V.

3. The regulator of claim 1, wherein the high level of the low voltage signal is 1.5V.

4. The regulator of claim 1, wherein the low level of the high voltage signal is 1.25V.

5. The regulator of claim 1, wherein the high level of the high voltage signal is 2.5V.

6. The regulator of claim 1, wherein the regulator is made by a low voltage CMOS manufacturing process.

7. A voltage level rising regulator, for converting a low voltage signal to a high voltage signal, wherein the low voltage signal is between a low level and a high level of the low voltage signal, and the high voltage level is between a low level and a high level of the high voltage signal, the voltage level rising regulator comprising:

a first NMOS transistor, having a drain, a gate and a source, wherein the low voltage signal is applied to the drain of the first NMOS transistor;

a first inverter, having an input terminal and an output terminal, wherein the low voltage signal is applied to the input terminal of the first inverter;

a second NMOS transistor, having a drain, a gate and a source, and the drain of the second NMOS transistor being coupled to the output terminal of the first inverter;

a first PMOS transistor, having a drain, a gate and a source, wherein the gate of the first PMOS transistor is connected to the source of the first NMOS transistor and the low level of the high voltage signal is inputted to the source of the first PMOS transistor;

a second PMOS transistor, having a drain, a gate and a source, wherein the drain of the second PMOS transistor is connected to the drain of the first PMOS transistor, and the high level of the high voltage signal is inputted to the source of the second PMOS transistor;

a third PMOS transistor, having a drain, a gate and a source, wherein the source is biased, the drain of the third PMOS transistor is connected to source of the first NMOS transistor, and the source of the third PMOS transistor is connected to the drain of the second PMOS transistor;

a fourth PMOS transistor, having a drain, a gate and a source, wherein the gate of the fourth PMOS transistor is connected to the source of the second NMOS transistor, the drain of the fourth PMOS transistor is connected to the gate of the second PMOS transistor, and the low level of the high voltage signal is inputted to the source of the fourth PMOS transistor;

a fifth PMOS transistor, having a drain, a gate and a source, wherein the drain of the fifth PMOS transistor is connected to the drain of the fourth PMOS transistor and the gate of the fifth PMOS transistor is connected to the drain of the first PMOS transistor, and the high level of the high voltage signal is inputted to the source of the fifth PMOS transistor;

a sixth PMOS transistor, having a drain, a gate and a source, wherein the source is biased, the drain of the sixth PMOS transistor is connected to the source of the second NMOS transistor, and the source of the sixth PMOS transistor is connected to the drain of the fifth PMOS transistor; and a second inverter, having an input end and an output end, wherein the input end of the second inverter is connected to the drain of the first PMOS transistor and the output end of the second inverter serves as the output end of the regulator.

8. The regulator of claim 7, wherein the low level of the low voltage signal is 0V.

9. The regulator of claim 7, wherein the high level of the low voltage signal is 1.5V.

10. The regulator of claim 7, wherein the low level of the high voltage signal is 1.25V.

11. The regulator of claim 7, wherein the high level of the high voltage signal is 2.5V.

12. The regulator of claim 7, wherein the regulator is made by a low voltage CMOS manufacturing process.

13. A method for rising a voltage level, for converting a low voltage signal to a high voltage signal, wherein the low voltage signal is between a low level and a high level of the low voltage signal, and the high voltage level is between a low level and a high level of the high voltage signal, the method comprising steps of:

converting the low level of the low voltage signal to the high level of the high voltage signal, and then outputting the high voltage signal, comprising:

applying the low level of the low voltage signal to a gate of a first PMOS transistor to turn on the first PMOS transistor;

applying the low level of the high voltage signal through the turned-on first PMOS to a gate of a second PMOS transistor to turn on the second PMOS transistor; and outputting the high level of the high voltage signal through the second PMOS transistor; and converting the high level of the low voltage signal to the low level of the high voltage signal, and then outputting the high voltage signal, comprising:

inverting the high level of the low voltage signal and then applying the inverted low voltage signal to a gate of a third PMOS transistor to turn on the third PMOS transistor; and outputting the low level of the high voltage signal through the third PMOS transistor.

14. The regulator of claim 13, wherein the low level of the low voltage signal is 0V.

15. The regulator of claim 13, wherein the high level of the low voltage signal is 1.5V.

16. The regulator of claim 13, wherein the low level of the high voltage signal is 1.25V.

17. The regulator of claim 13, wherein the high level of the high voltage signal is 2.5V.

18. A device for converting a low voltage signal to a high voltage signal, wherein the low voltage signal is between a first low level and a first high level; and the high voltage signal is between a second low level and a second high level; and the second high level is greater than the first high level; and the first high level is greater than one half of the second high level, the device comprising:

a first PMOS transistor, having a drain, a gate and a source, wherein the source of the first PMOS transistor is supplied with a voltage of the second low level;

a second PMOS transistor, having a drain, a gate and a source, wherein the drain of the second PMOS transistor is coupled to the drain of the first PMOS transistor, and the source of the second PMOS transistor is supplied with a voltage of the second high level;

a third PMOS transistor, having a drain, a gate and a source, wherein the drain and source of the third PMOS transistor are coupled to the gate of the first PMOS transistor and the drain of the second PMOS transistor, respectively;

a fourth PMOS transistor, having a drain, a gate and a source, wherein the drain of the fourth PMOS transistor is coupled to the gate of the second PMOS transistor, and the source of the fourth PMOS transistor is supplied with the voltage of the second low level;

a fifth PMOS transistor, having a drain, a gate and a source, wherein the drain and gate of the fifth PMOS transistor are coupled to the drain of the fourth PMOS transistor and the drain of the first PMOS transistor, respectively, and the source of the fifth PMOS transistor is supplied with the voltage of the second high level; and a sixth PMOS transistor, having a drain, a gate and a source, wherein the drain and source of the sixth PMOS transistor are coupled to the gate of the fourth PMOS transistor and the drain of the fifth PMOS transistor, respectively;

wherein the high voltage signal is produced from the drain of the fifth PMOS transistor;

the low voltage signal being at the first low level is converted into the high voltage signal of the second high level by applying the low voltage signal to the gate of the first PMOS transistor; and the low voltage signal being at the first high level is converted into the high voltage signal of the second low level by inverting the low voltage signal and applying the inverted low voltage signal to the gate of the fourth PMOS transistor; whereby no current path for DC leakage exists between the second low level and the second high level.

19. The device of claim 18, wherein the first low level is 0V.

20. The device of claim 18, wherein the first high level is 1.5V.

21. The device of claim 18, wherein the second low level is 1.25V.

22. The device of claim 18, wherein the second high level is 2.5V.

23. The device of claim 18, wherein the device is manufactured by a low voltage CMOS manufacturing process.

24. The device of claim 23, wherein the second low level of the high voltage signal is accurately defined and is not affected by manufacturing parameters.

25. A method for converting a low voltage signal to a high voltage signal, wherein the low voltage signal is between a first low level and a first high level; and the high voltage signal is between a second low level and a second high level; and the second high level is greater than the first high level; and the first high level is greater than one half of the second high level, the method comprising the steps of:

applying a voltage of the second high level to the sources of first and second PMOS transistors;

applying a voltage of the second low level to the sources of third and fourth PMOS transistors, wherein the drains of the third and fourth PMOS are coupled to the drains of the first and second PMOS transistors, respectively, and the drains of the third and fourth PMOS transistors are coupled to the gates of the second and first PMOS transistors, respectively;

using the drain of the second PMOS transistor as an output terminal for producing the high voltage signal;

if the low voltage signal is at the first low level, applying the low voltage signal to the gate of the third PMOS transistor to turn on the third and second PMOS transistors, and turning off the first and fourth PMOS transistors by applying the voltage of the second high level obtained at the drain of the second PMOS transistor to the gates of the first and fourth PMOS transistors; and if the low voltage signal is at the first high level, inverting the low voltage signal and applying the inverted low voltage signal to the gate of the fourth PMOS transistor to turn on the fourth and first PMOS transistors, wherein the voltage of the second low level is obtained at the drain of the second PMOS transistor through the drain and source of the fourth PMOS transistor, and turning off the second and third PMOS transistors by applying the voltage of the second high level obtained at the drain of the first PMOS transistor to the gates of the second and third PMOS transistors;

whereby no current path for DC leakage exists between the second low level and the second high level.

26. The method of claim 25, wherein the first low level is 0V.

27. The method of claim 25, wherein the first high level is 1.5V.

28. The method of claim 25, wherein the second low level is 1.25V.

29. The method of claim 25, wherein the second high level is 2.5V.

30. The method of claim 25, wherein the second low level of the high voltage signal is accurately defined and is not affected by manufacturing parameters when a low voltage CMOS manufacturing process is employed in implementation.

* * * * *